June 26, 1956     J. S. PORTER     2,751,787
SAMPLING TUBE WITH DRAIN VALVE
Filed April 19, 1954
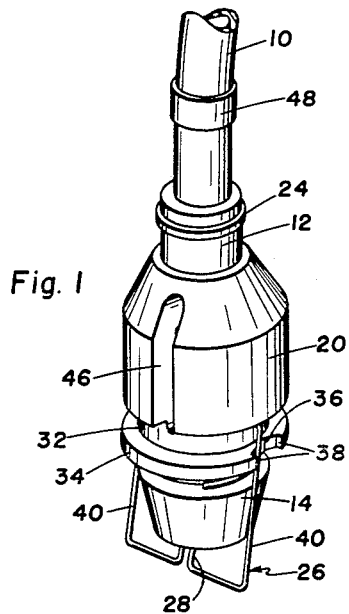
Fig. 1
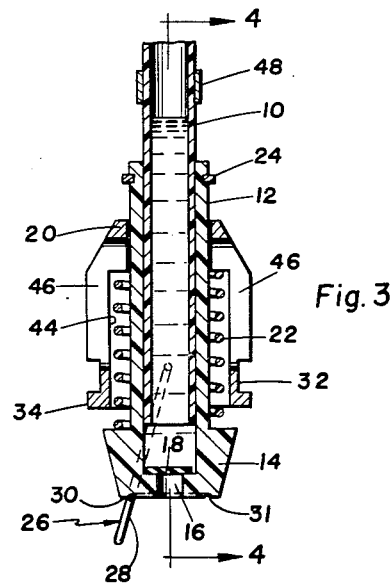
Fig. 3
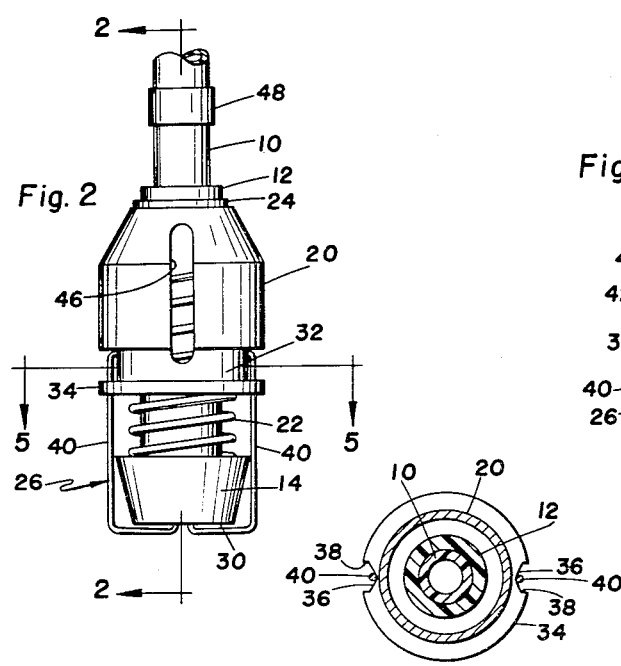
Fig. 2
Fig. 5
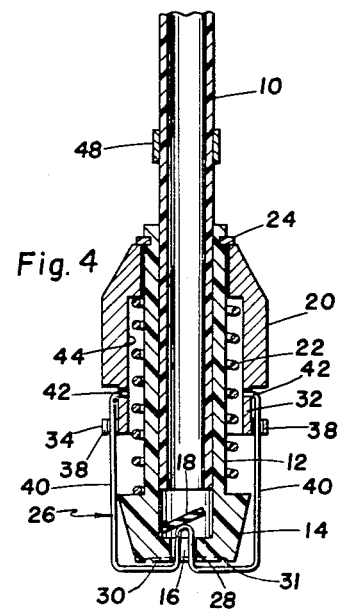
Fig. 4
INVENTOR.
JOHN S. PORTER
BY Knox & Knox
Agents United States Patent Office 2,751,787
Patented June 26, 1956

2,751,787
SAMPLING TUBE WITH DRAIN VALVE

John S. Porter, Escondido, Calif.

Application April 19, 1954, Serial No. 424,011

4 Claims. (Cl. 73—425.4)

The present invention relates generally to the checking and sampling of fluid in storage tanks and more particularly to a dip stick assembly comprising a flexible, transparent sampling tube with an automatic draining valve.

The primary object of this invention is to provide a fluid sampling device which is designed to be lowered into a fluid storage tank and has a novel valve structure which allows the device to retain a sample of the fluid.

Another object of this invention is to provide a fluid sampling device having an extended flexible sampling tube, which is transparent to facilitate inspection of the nature and quantities of the fluid content.

Another object of this invention is to provide a fluid sampling device having a weighted barrel portion to carry the sampling tube below the surface of the fluid, the barrel having viewing ports to permit inspection of the lower end of the tube adjacent the valve.

Another object of this invention is to provide a fluid sampling device having a novel valve release actuated by inertia, so that the fluid may be drained from the sampling tube merely by shaking the device.

Another equally important object is to provide a liquid measuring device which is the full functional substitute for the conventional dip stick and measuring tape and which functions without the complication of evaporation making accurate reading of the former difficult, and in the case of the latter, the complication of penetration of liquids to all portions of the wound reel.

Another object of this invention is to provide a fluid sampling device which is inexpensive and practicable to manufacture.

Finally, it is an object to provide a fluid sampling device of the aforementioned character which is simple, safe and convenient to operate, and which will give generally efficient and durable service.

With these and other objects definitely in view, this invention consists in the novel construction, combination and arrangement of elements and portions as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing, and in which:

Fig. 1 is a perspective view of the sampling device.

Fig. 2 is a side elevation view thereof in the draining position.

Fig. 3 is a sectional view taken on the line 3—3 of Fig. 2, but showing the device in the sampling and inspecting position.

Fig. 4 is a sectional view taken on the line 4—4 of Fig. 3, but showing the device in the draining position.

Fig. 5 is a sectional view taken on the line 5—5 of Fig. 2.

Referring now to the drawing in detail, the sampling device comprises a transparent, flexible sampling tube 10 to the end of which is attached a sleeve 12 having at its lower end an enlarged boss 14. In the boss 14 is an inlet aperture 16 over which is superimposed a valve disc 18. Slidably mounted on the sleeve 12 is a barrel 20 which is biased upwardly by a spring 22, said barrel being retained by a retaining ring 24 fitted to the upper end of said sleeve. Pivotally attached to the barrel 20 is a valve actuating clip 26 having an upwardly projecting lobe 28 which extends through the inlet 16 to lift the valve disc 18. The sleeve 12 is of transparent material and is sealed to the sampling tube 10 to prevent leakage. The boss 14 has a generally flat end surface 30 having a ring groove 31.

The barrel 20 has an annular undercut portion 32 adjacent its lower end which defines a lower flange 34. Cut in the flange 34 are diametrically opposed cam notches 36, which are generally V-shaped and have flat end stops 38. The clip 26 may be bent from resilient wire for simplicity and has upwardly extending arms 40 which rest in the cam notches 36, said arms having inwardly turned ends 42 which engage in opposed bores provided in the undercut portion 32, thus providing for pivotal movement of the clip 26, all as shown in Fig. 4. The resiliency of the clip 26 is sufficient to retain the ends 42 in place. The lobe 28 comprises a simple return folded loop in the wire and is shaped to slide easily into the inlet 16.

The spring 22 fits around the sleeve 12, the lower end thereof resting on the boss 14. The upper end of the spring 22 is retained in a deep socket 44 in the barrel 20 so that the barrel is held upwardly away from the boss 14. Thus the lobe 28 of the valve actuating clip is held in place in the inlet 16 to hold the valve disc 18 in the raised or open position, as shown in Fig. 4. The barrel 20 is provided with opposed viewing ports 46, which constitute vertically elongated slots.

The sampling tube 10 is fitted with a plurality of marker rings 48, one of which is indicated in the drawing as an example. These marker rings 48 are frictionally held in place and are thus adjustable, so that the sampling tube 10 may be calibrated as desired to indicate various amounts of fluid contained therein.

To sample the fluid in a tank, the device is prepared by forcing the barrel 20 downwardly against the spring 22 to release the lobe 28 from the inlet 16, thus allowing the valve disc 18 to overlie the inlet. The clip 26 is then pivoted to one side so that the lobe 28 rests in the ring groove 31, as shown in Fig. 3, the barrel 20 then being released so that the spring 22 retains said lobe firmly in place against said end surface. With the clip 26 in this offset position the arms 40 are against the end stops 38, as shown in Fig. 1, and said arms are also forced slightly outwardly by the slope of the cam notches 36, so that the clip is biased toward return to the center position.

The device is lowered into the tank or storage vessel, the weight of the barrel 20 being sufficient to sink the device to the bottom of the vessel. The fluid enters the inlet 16, lifting the free valve disc 18, and rises in the sampling tube 10. When the boss 14 is resting on the bottom of the vessel the level of fluid in the sampling tube 10 will be equal to that in the storage vessel. Moreover, any foreign matter such as water, which may be present as a layer beneath the fluid, will also be present in the sampling tube 10, the level of such foreign matter in the tube also indicating the quantity thereof. The device is sufficiently small that the fluid is not disturbed unduly by the insertion of the device, thus the layers of various fluids, such as they may be are represented in their true amounts in the sampling tube 10.

When the device is removed from the fluid, the valve disc 18 is held firmly in place by the fluid in the sampling tube 10. The level of the fluid may be determined by inspection with reference to marker rings 48. Any water present will ordinarily be of small amount and may be confined to the lower portion of the sleeve 12. The viewing ports 46 permit visual inspection of this lower portion of the device so that the presence of such foreign matter may be readily determined.

After the fluid content has been ascertained, the sampling tube 10 is drained by merely jerking or shaking the device. The inertia of the barrel 20 is sufficient to overcome the spring 22 so that the lobe 28 is freed from the end surface 30. The resilient pressure of the arms 40 in the cam notches 36 then causes the clip 26 to snap back to a central position so that the lobe 28 enters the inlet 16 and lifts the valve disc 18, thus allowing the fluid to escape.

The device is particularly suitable for checking the contents of fuel tanks in service stations, mobile fuel tanks, or oilfield storage tanks. The various parts of the device may be constructed from many suitable materials which are impervious to the fluids which may be sampled. The structure is extremely simple and compact, and the device may easily be carried in a pocket or tool kit. The sampling tube 10 may be of any desired length according to the depth of fluid to be sampled, said tube being coiled neatly when not in use.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. A fluid sampling device comprising a transparent tube having at one end a valve body, a non-return inlet valve in said body, a barrel slidably mounted on said body, means to bias said barrel to move axially of said barrel and away from said one end of the tube, a valve-actuating clip pivotally attached to said barrel, said clip being frictionally engaged with the end of said body at one position of said barrel and holding said valve open at another position of said barrel.

2. A fluid sampling device comprising a flexible transparent tube having at one end a rigid sleeve, an inlet in the end of said sleeve and a non-return valve at said inlet, a barrel slidably mounted on said sleeve, a valve-actuating clip pivotally attached to said barrel, said clip having an extended lobe portion frictionally engaging the end of said sleeve at one position of said barrel, and said lobe entering said inlet to open said valve at another position of said barrel.

3. A fluid sampling device comprising a flexible transparent tube having at one end a rigid sleeve, an inlet in the end of said sleeve and a non-return valve at said inlet, a barrel slidably mounted on said sleeve, a resilient valve-actuating clip pivotally attached to said barrel and having an extended lobe thereon for opening said valve through said inlet, cam means on said barrel to hold said clip in axial alignment therewith, spring means biasing said barrel to hold said lobe frictionally against the end of said sleeve in one position and to enter said inlet in another position.

4. A fluid sampling device comprising a flexible transparent tube having at one end a rigid transparent sleeve, an inlet in the end of said sleeve, and a non-return valve at said inlet, a barrel slidably mounted on said sleeve, and a spring biasing said barrel away from the end thereof toward said tube, viewing ports extending through said barrel, a resilient valve actuating clip pivotally attached to said barrel and having a valve engaging lobe, said lobe being frictionally held against the end of said sleeve at one position of said barrel with said spring compressed whereby motion of said barrel to overcome said spring by inertia releases said lobe from said sleeve, and means for centering said lobe when released so that the lobe enters said inlet to open the valve as the barrel is moved away from the end of the sleeve by said spring.

References Cited in the file of this patent

UNITED STATES PATENTS

| | | |
|---|---|---|
| 1,099,947 | Synder | June 16, 1914 |
| 2,257,357 | Watson | Sept. 30, 1941 |
| 2,593,830 | Baker | Apr. 22, 1952 |
| 2,674,129 | Cannell | Apr. 6, 1954 |

FOREIGN PATENTS

| | | |
|---|---|---|
| 438,467 | Great Britain | Nov. 18, 1935 |